United States Patent
Larsen et al.

(10) Patent No.: US 9,834,727 B2
(45) Date of Patent: Dec. 5, 2017

(54) PROCESS FOR THE PRODUCTION OF BIOFUEL

(75) Inventors: Tommy Frederik Larsen, Slagelse (DK); Erik Rose Andersen, Gjerlev (DK); Anders Hjortshoj, Risskov (DK)

(73) Assignee: ORGANIC FUEL TECHNOLOGY A/S, Risskov (DK)

( * ) Notice: Subject to any disclaimer, the term of this patent is extended or adjusted under 35 U.S.C. 154(b) by 1169 days.

(21) Appl. No.: 13/642,721

(22) PCT Filed: Apr. 20, 2011

(86) PCT No.: PCT/DK2011/050129
§ 371 (c)(1),
(2), (4) Date: May 6, 2013

(87) PCT Pub. No.: WO2011/131207
PCT Pub. Date: Oct. 27, 2011

(65) Prior Publication Data
US 2013/0205649 A1    Aug. 15, 2013

(30) Foreign Application Priority Data

Apr. 23, 2010 (EP) .................................... 10160895

(51) Int. Cl.
*C10B 53/02* (2006.01)
*C10B 53/07* (2006.01)
(Continued)

(52) U.S. Cl.
CPC ............... *C10B 53/02* (2013.01); *C08J 11/16* (2013.01); *C10B 53/07* (2013.01); *C10G 1/00* (2013.01);
(Continued)

(58) Field of Classification Search
USPC .................................................. 44/300, 307
See application file for complete search history.

(56) References Cited

U.S. PATENT DOCUMENTS

| 6,184,427 B1 | 2/2001 | Klepfer et al. |
| 2003/0027712 A1* | 2/2003 | Vaughn ................... B01J 29/04 502/63 |

(Continued)

FOREIGN PATENT DOCUMENTS

| CN | 101066904 | 11/2007 |
| EP | 1318300 A1 | 6/2003 |

(Continued)

OTHER PUBLICATIONS

BFT Bionic Fuel Technologies AG: Microwave Depolymerization (MWDP), Process Engineering Plant for the Synthetic Production of Fuels from Biomass and Waste Materials Engineered and Manufactured, Apr. 10, 2009.

*Primary Examiner* — Ellen McAvoy
*Assistant Examiner* — Chantel Graham
(74) *Attorney, Agent, or Firm* — Avery N. Goldstein; Blue Filament Law PLLC

(57) ABSTRACT

The present invention describes a process for the production of biofuel, said process comprising, pretreating a feedstock, mixing a catalyst with said feedstock, transferring the mixture of catalyst and feedstock into a reactor, and subjecting said mixture to a heating sequence by applying microwave energy thereto, wherein the catalyst comprises an aluminosillicate mineral, the percentage of aluminosillicate mineral in the catalyst-feedstock mixture is less than 10% (w/w), and the temperature of the mixture of catalyst and feedstock is no higher than 450° C. during the process.

12 Claims, 4 Drawing Sheets

(51) Int. Cl.
    *C08J 11/16*     (2006.01)
    *C10G 1/00*     (2006.01)
    *C10G 1/08*     (2006.01)
    *C10G 1/10*     (2006.01)
    *C10G 32/02*     (2006.01)
    *C10L 1/02*     (2006.01)

(52) U.S. Cl.
    CPC ............... *C10G 1/08* (2013.01); *C10G 1/086* (2013.01); *C10G 1/10* (2013.01); *C10G 32/02* (2013.01); *C10L 1/02* (2013.01); *C10G 2300/1003* (2013.01); *C10G 2300/1014* (2013.01); *C10L 2230/04* (2013.01); *C10L 2290/02* (2013.01); *C10L 2290/06* (2013.01); *C10L 2290/08* (2013.01); *C10L 2290/10* (2013.01); *C10L 2290/36* (2013.01); *Y02E 50/13* (2013.01); *Y02E 50/14* (2013.01); *Y02E 50/32* (2013.01); *Y02P 30/20* (2015.11); *Y02W 30/705* (2015.05)

(56) References Cited

U.S. PATENT DOCUMENTS

| | | |
|---|---|---|
| 2009/0044482 A1 | 2/2009 | Tooman |
| 2011/0011721 A1* | 1/2011 | Champagne ............. B01J 29/06 201/20 |

FOREIGN PATENT DOCUMENTS

| | | |
|---|---|---|
| WO | 2004035714 | 4/2004 |
| WO | 2007095940 A1 | 8/2007 |
| WO | 2009010435 | 1/2009 |
| WO | 2009067266 | 5/2009 |

* cited by examiner

PROCESS FOR THE PRODUCTION OF BIOFUEL

TECHNICAL FIELD

The present invention relates to a process for the production of biofuel. In particular the present invention relates to a process for the conversion of a feedstock to biofuel using microwave heating and a depolymerisation catalyst.

BACKGROUND OF THE INVENTION

Due to the depletion of fossil fuels and the concerns regarding the environmental impacts of fossil fuel burning, there is a need for rapid development of production methods for sustainable fuels including biofuels replacing fossil fuels.

Methods for the production of so called first generation biofuel have been developed, but have the disadvantage of using feedstock such as sugar, starch, vegetable oil, or animal fats, which are derived from food crops or animals that may have more useful purposes than fuel production.

For example WO 2004/035714 describes a method for the production of a first generation biofuel, where a plant or animal oil is contacted with an acid catalyst, such as a zeolite, creating an oil-catalyst mixture. The mixture is subjected to microwave energy thereby producing biofuels via a catalyzed transesterification process.

Second generation biofuel production processes can use a variety of non food crops. These include waste biomass, the stalks of wheat, barley, corn, wood, and special energy- or biomass crops. Many second generation biofuels are under development such as biohydrogen, biomethanol, biodiesel, Fischer-Tropsch diesel, biohydrogen diesel, mixed alcohols and wood diesel. The production of second generation biofuels may use biological or thermal depolymerisation of the biomass material to obtain the fuel. For thermal depolymerisation the additional use of chemical catalysts provides for a more efficient depolymerisation process, via a Thermo Catalytic Depolymerisation Process (TCDP). Heating may for some feedstocks be provided by microwave energy.

Thus, WO 2009/067266 describes a method of manufacturing diesel, comprising the steps of providing a feedstock, processing the feedstock to provide hydrogen deficient carbon and first volatiles, using superheated natural gas at a temperature between 1000-1500° F. (537-816° C.) and subsequently hydrogenating the hydrogen deficient carbon material followed by processing the hydrogen deficient carbon material into second volatiles and diesel. In one embodiment the processing of the activated carbon into diesel is performed using depolymerisation and polymerization with microwave heating and a zeolite catalyst.

WO 2009/010435, U.S. Pat. No. 6,184,427 and CN 20071069214 all describe methods of converting plastic waste materials comprising various polyethylenes into lighter hydrocarbons using microwave energy and various catalyst. None of the processes are for the production of biofuel. Also, WO 2009/010435 is a process performed in aquous solution, and is unsuitable for production of biofuels, and no experimental data is presented for a aluminosilicate based catalyst. U.S. Pat. No. 6,184,427 uses both sentizisers and catalysts in relatively large amounts starting from 30% and upwards. CN 20071069214 does not used aluminosilicate based catalysts.

The above methods for the production of biofuel require significant processing of the raw feedstock material prior to processing it into biofuel, i.e. by either extraction of oil residues from plants or animals, or activation of feedstock into hydrogen deficient carbon using superheated gas. Hence, an improved process for the production of biofuel would be advantageous, and in particular a more high-yielding and energy efficient process where a feedstock is converted into biofuel would be advantageous.

SUMMARY OF THE INVENTION

Thus, an object of the present invention relates to an improved process for the conversion of a feedstock to a biofuel comprising microwave heating and a catalyst.

In particular, it is an object of the present invention to provide a process for the conversion of a feedstock to a biofuel comprising microwave heating and a catalyst, wherein relatively low temperatures and close to ambient pressures are employed and wherein as much energy as possible used in the process consists of recycled process energy. The process described herein solves at least the above mentioned problems of the prior art with energy inefficient processes involving extraction of plant or animal oil from a 1st generation biofeedstock or high temperature conversion of the raw biofeedstock using e.g. high temperature superheated gas to provide an activated hydrogen deficient feedstock. The process is also efficient for breaking down lignin in biomass material to phenol constituents.

Thus, the first aspect of present invention is a process for the production of biofuel, said process comprising,
  pretreating a feedstock,
  mixing a catalyst with said feedstock,
  transferring the mixture of catalyst and feedstock into a reactor, and
  subjecting said mixture to a heating sequence by applying microwave energy thereto, wherein
  the catalyst comprises an aluminosillicate mineral, the percentage of aluminosillicate mineral in the catalyst-feedstock mixture is less than 10% (w/w), and the temperature of the mixture of catalyst and feedstock is no higher than 450° C. during the process.

Another aspect of the present invention relates to a biofuel product obtainable by the process of the present invention.

DETAILED DESCRIPTION OF THE INVENTION

Definitions

Figure 1:
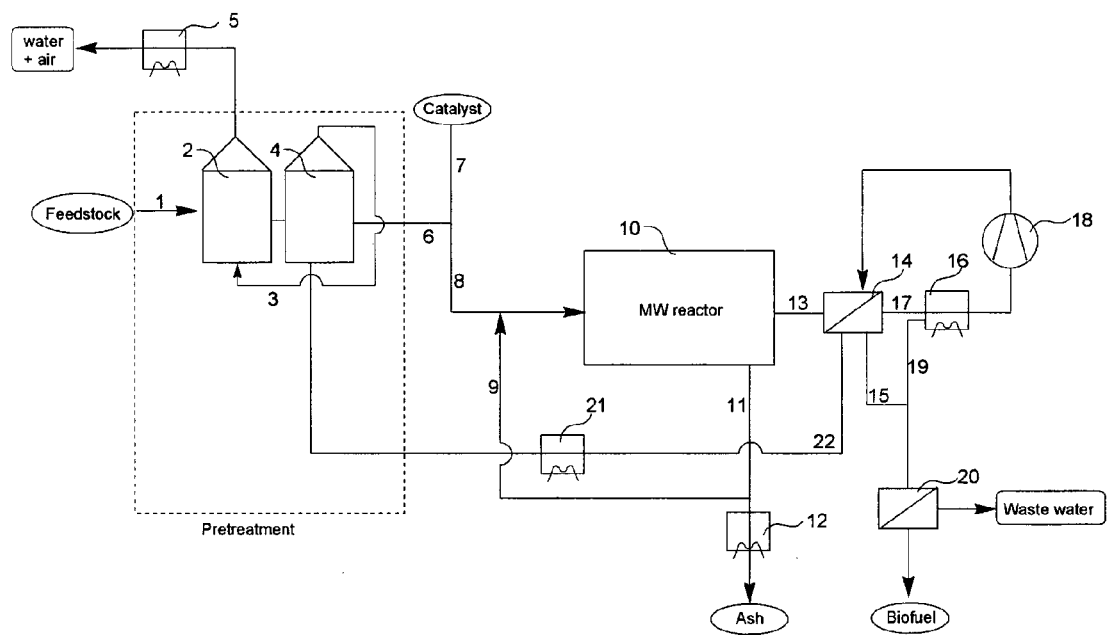
FIG. 1 is a flow diagram showing an outline of the components of the currently preferred process. An explanatory text to FIG. 1 is found at the end of the detailed description.

Prior to discussing the present invention in further details, the following terms and conventions will first be defined:

Biofuel

In the context of the present invention a biofuel in its broadest sense is any fuel or oil which is industrially applicable and originates from a biological and/or renewable resource. Biological and/or renewable resources include waste materials from industry and farming, but do not include fossil fuels such as e.g. coal or oil. The biofuel may be a raw biofuel, in the sense that it may need further processing before reaching an end-user, for example it may contain components that needs to be removed prior to use in e.g. a vehicle, via for example further distillation and/or chemical processes (refining). Various definitions are used in defining classes of fuel or petroleum products. For example a diesel fuel may be defined by a boiling point range, or by the length of the hydrocarbon chains it consists of. In addition to this certain minimum requirements may have to be met in order to market a fuel or biofuel as for example a "diesel" (e.g. European standard EN 590) or a "biodiesel" (e.g. International standard EN 14214).

Catalyst

In the context of the present invention a catalyst is a chemical compound or composition capable of catalysing the production of biofuel from a feedstock in the process of the present invention, i.e. the catalytic depolymerisation process. The catalyst is effective in catalytic amounts, i.e. less than 1 molar equivalent of catalyst as compared to feedstock is necessary to enhance the reaction rate, and also the catalyst must remain effective at the elevated temperatures used in the present process. The catalyst may be a composition containing a certain percentage of active catalyst material and additional components such as for example stabilizers, fillers, binders and/or colour.

Feedstock

In the context of the present invention a feedstock is a material originating from a biological and/or renewable resource, which comprises polymerised hydrocarbon chains capable of forming a biofuel when subjected to the microwave and catalytically enhanced depolymerisation process of the present invention. A range of materials fulfil these conditions and examples are cited in the below detailed description. Common for the listed examples is that they are solid or semi-solid materials or high viscosity liquids, i.e. they are not low viscosity liquid materials at room-temperature. They may however comprise some liquid content, such as water, and feedstock therefore also comprises slurries.

Volatile Hydrocarbons

In the context of the present invention volatile hydrocarbons are to be understood as any organic compounds that are more volatile (i.e. have a lower boiling point) than the biofuel fraction collected in the process. These may typically be short chain hydrocarbons but also include e.g. short chain esters or acids.

Operating Pressure

In the context of the present invention the operating pressure is the pressure within the reactor where the microwave heating occurs. The operating pressure of the present invention is consistently defined in ranges, since the actual pressure may fluctuate slightly over time and within the volume of the reactor due to development of gaseous substances from the feedstock and the addition of gas, such as nitrogen and/or other inert gases. The operating pressure is described with reference to the ambient or atmospheric pressure. In the present context the atmospheric pressure at sea level is defined as 101.3 kPa, but it varies slightly with weather and altitude.

Residual Material

In the present context residual material is the solid material that is left when the feedstock has been through the biofuel production process of the present invention. Thus, it constitutes the material that has not been converted to biofuel, water vapour and/or hydrocarbon volatiles. The residual material thus consists of residue originating from either the feedstock and/or the catalyst. This residue may also include small amounts of unconverted feedstock.

Having made the above definitions the process of the present invention is described in detail below. See FIG. 1 for an outline of the presently preferred process.

Microwave Enhanced Thermo Catalytic Depolymerisation Process

The first aspect of present invention is process for the production of biofuel, said process comprising,
  pretreating a feedstock,
  mixing a catalyst with said feedstock,
  transferring the mixture of catalyst and feedstock into a reactor, and
  subjecting said mixture to a heating sequence by applying microwave energy thereto, wherein
  the catalyst comprises an aluminosillicate mineral, the percentage of aluminosillicate mineral in the catalyst-feedstock mixture is less than 10% (w/w), and the temperature of the mixture of catalyst and feedstock is no higher than 450° C. during the process.

The temperature may advantageously be even lower such as no higher than 400° C., 390° C., 380° C., 370° C., 360° C., 350° C., 340° C. preferably no higher than 330° C. during the process.

It was surprisingly found that the present process performs efficiently even at relatively low reaction temperatures. This has several advantages including low heating energy consumption, lower demands to reactor heat tolerance and therefore construction costs and also the residual material produced at low temperatures retains a fibrous structure, making it more useful as e.g. a fertilizing agent than a material that has been thermally degraded in a more severe fashion.

The process as described above may be a batch process, but it is preferably a continuous process. By continuous process is meant a process wherein the feedstock and catalyst mixture is fed into the reactor continuously and converted to biofuel, other volatiles and residual materials continuously.

In a preferred embodiment the process for the production of biofuel involves three temperature stages
  a water-removal stage, wherein the temperature of the feedstock or the mixture of catalyst and feedstock is within the range of 80-120° C., such as 85-110° C., preferably 90-105° C.;
  an intermediate stage, wherein the temperature of feedstock or the mixture of catalyst and feedstock is raised to a temperature within the range of 100-300° C., such as 100-290° C., preferably in the range of 100-280° C.;
  a biofuel production stage, wherein the temperature of the mixture of catalyst and feedstock is raised to a temperature within the range of 250-600° C., such as 260-500° C., 270-400° C., 280-350° C. preferably 300-330° C.

In one embodiment the above three stages are integrated in the microwave heating process occurring in the reactor and are thus part of the heating sequence. Thus for example the feedstock may be preheated to e.g. 80° C., as part of the pretreatment, mixed with catalyst and transferred to the reactor where the water removal stage begins using microwave heating of the mixture of catalyst and feedstock.

In a preferred embodiment said heating sequence of the mixture of catalyst and feedstock by applying microwave energy thereto is controlled by moving the said mixture through the reactor past static microwave generators comprising magnetrons. The microwave energy delivered to a given part of said mixture may therefore be adjusted according to which particular microwave generator this part of the mixture is positioned under at a given point in time of the sequence and the power delivered by this microwave generator. The continuous movement of the mixture through the reactor facilitates the abovementioned continuous process, where the mixture goes through the one, two or three temperature stages as described above, during its physical movement past the microwave generators. Apart from facilitating a continuous process, this controlled heating sequence has the advantage of facilitating control of the time spent at each of the said three temperature stages. It also facilitates control of the process in a manner whereby a given part of the mixture exits the reactor when it produces no more biofuel, e.g. when it has been completely converted to residual material. Thus, unnecessary heating of "spent" mixture is avoided, and incomplete conversion into biofuel is also minimized.

Advantageously, the energy delivered by the individual microwave generators may be adjusted during the sequence, for example depending on temperature measurements at separate points along the pathway of the mixture of feedstock and catalyst in the reactor. The temperature of said part of the mixture may rise in a continuous fashion, or it may rise in steps, where the time at a given temperature stage may be adjusted and/or optimized according to which catalyst or feedstock is used, and other factors such as for example the operating pressure in the reactor, and the relative amount of volatiles released at a given stage. Alternatively or simultaneously the temperature of a given part of the mixture may be adjusted by the speed by which the mixture moves inside the reactor. This type of process has the advance that a "thermo profile" may be setup for individual feedstocks, as a starting point, and optionally adjusted according to temperature feedback to accommodate the natural variations that are present for a given feedstock from day to day. The thermo profile dictates that at a certain point in the reactor the feedstock should have a certain ideal temperature, and the microwave power of individual magnetrons is adjusted accordingly. The energy output of an individual microwave generator may be varied by simply switching it on and off in defined intervals, or by continuously adjusting the power output. Alternatively the power output is constant and the heating sequence is controlled by the speed of the conveyor moving the feedstock through the reactor.

Power output vary according to the scale of the reactor, and the system as a whole. For a system scale converting about 100 Kg of material per hour, the power of the individual microwave generators may for example be 60 kW.

In another alternative embodiment the water removal stage or both the water removal stage and the intermediate stage occur prior to transferring the mixture of feedstock and catalyst to the reactor. In these embodiments the water removal stage alone or the water removal stage and the intermediate stage are comprised in the pretreatment of the feedstock. The catalyst may be added at any stage prior to transfer to the reactor.

In another embodiment a full heating sequence, i.e. a sequence where all three stages are included is performed within a time range of 10-600 min, such as 20-400 min, 30-300 min, 35-200 min, 40-150 min, 45-120 min, 50-100 min, such as preferably 60 min. The time period of a full sequence may be adjusted within the above ranges according to feedstock and catalyst used. The elapsed time of one heating sequence along with the overall scale of the process system determines the biofuel output per hour of the process. Thus, a short heating sequence is advantageous, such as a heating sequence no longer than 200 min, 150 min, 120 min, 100 min, 80 min, 60 min, 40 min, 20 min such as no longer than 10 min.

In a preferred embodiment the described process comprising a continuous microwave assisted heating sequence for a given part of the feedstock and catalyst mixture is provided by a moving bed reactor. In a moving bed reactor the mixture of catalyst and feedstock is transported through the reactor in the form of a moving bed. The moving bed of feedstock and catalyst may be achieved in numerous ways, one example may be simply a belt that may preferably comprise indentations or a textured surface or separating units perpendicular to the belts moving direction (see FIG. 2 for an illustrative example). In an alternative embodiment the movement of the feedstock though the microwave reactor is provided by a screw conveyor. The advantage of a screw conveyor is that apart from providing a moving bed of material progressing through the reactor it also provides mixing of the bed, so that new material is moved to the surface nearest to the microwave generators, and homogenous conversion is improved. It also reduces efficiency decreases due to a layer of carbon material that may form a "lid" that partially blocks microwaves on other type of moving bed conveyors.

In another embodiment the operating pressure in the reactor is in the range of 50-130 kPa, such as in the range of 60-125 kPa, 70-120 kPa, 80-115 kPa, 85-110 kPa, preferably 90-105 kPa. A significant advantage of the present process is that the operating pressure in the reactor is moderate, meaning it is relatively close to atmospheric pressure, i.e. it is neither a high pressure process nor a high vacuum process. Thus fewer demands to the build strength of the reactor and materials used therefore are present, which reduces costs of both the reactor and maintenance thereof. Furthermore less energy is used in the process as compared to high pressure or high vacuum processes. The operating pressure is maintained constant throughout the process and varies less than 2 kPa, such as less than 1 kPa, 0.5 kPa, 0.3 kPa, such as less than 0.1 kPa.

In another embodiment the operating pressure in the reactor is lower than the atmospheric pressure, such as in the range 50.0-101.3 kPa, 60.0-101.3 kPa, 70.0-101.3 kPa, 80.0-101.3 kPa, preferably 90.0-101.3 kPa. A lower than atmospheric pressure is advantageous with respect to reducing the boiling points of the volatiles developed, e.g. volatile hydrocarbons and the biofuel fraction, thereby reducing the necessary heating energy input to the process. Furthermore, no volatile gases are leaked into the local environment, such as the building the reactor is installed in, and this provides for a cheaper installation due to fewer safety precautions in said installation.

In another embodiment the operating pressure in the reactor is higher than the atmospheric pressure, such as in the range 101.3-130.0 kPa, 101.3-120.0 kPa, 101.3-110.0 kPa, 101.3-105.0 kPa, preferably 101.3-103.0 kPa. An advantage of operating at pressures higher than the ambient pressure or the atmospheric pressure in the reactor is that it reduces demands towards the insulation of the reactor, as no outside air will enter into the reactor. Outside air containing oxygen causes unwanted side-reactions in the process of the present invention as described below.

In another embodiment inert gas is added to the reactor. The addition of inert gas may both help control the pressure in the reactor as well as displacing any unwanted gases such as oxygen. The presence of oxygen in the reactor enables an unwanted combustion reaction of the feedstock, which reduces yield of the desired biofuel product. Thus, in a preferred embodiment the concentration of oxygen is no higher than 5.0%, such as no higher than 3.0%, 2.0%, 1.0%, preferably 0.5%. Inert gas may also advantageously be added to the feedstock input pathway, so as to stop any oxygen gas from entering via this route. The inert gas may preferably be $CO_2$ or nitrogen and must at least be inert with respect to the present process.

In another embodiment the microwave radio frequency applied is in the range from about 0.1-10.0 GHz, such as 0.3-7.0 GHz, 0.5-5.0 GHz, 0.7-4.0 GHz, 0.8-3.0 GHz, preferably 2.45 GHz. The choice of microwave power and frequency influences the length of the carbon chains in the biofuel product and therefore may it may be chosen so as to maximize the yield of the desired type of biofuel product, such as for example biodiesel. The combination of microwave induced heating and a catalyst which interacts with said microwaves is essential to the present process, since a analogous process causing conventional heating does not provide an effective conversion of the feedstock to biofuel. Without being bound to theory it is believed that the molecular bond vibrations induced by microwaves in conjunction with the catalyst of the present invention provides for a more efficient process, than that obtained using non-microwave heating. Another advantage of the present microwave enhanced process is that the biofuel product of the present invention comprises a range of phenol derivatives, which is due to the lignin components of the feedstocks being depolymerized by the present catalytic microwave enhanced process.

The catalyst comprises an aluminosillicate mineral, preferably a hydrated aluminosillicate mineral such as a zeolite. The aluminosillicate mineral is the active catalyst material. As described above the catalyst may contain other components than the active catalyst material. Although other catalyst may be useful in the present process aluminosillicate minerals, and especially zeolites, have surprisingly been proven to be highly effective depolymerisation catalysts in the present process. They have several advantages as a heterogeneous catalyst in the present process, such as high surface area per volume, good absorption of microwave energy, and an ability to depolymerize various feedstocks in high yields and with a consistent carbon chain length leading to a more homogenous biofuel product. The currently preferred zeolite catalyst may be selected from the group consisting of naturally occurring zeolites, synthetic zeolites, synthetic zeolites having a 3 Å pore size, synthetic zeolites having a 4 Å pore size and a type 407 zeolite.

A described above the catalyst may or may not be 100% active catalyst material, i.e. in this case aluminosilicate mineral. It is sometimes preferred to have other materials incorporated in the catalyst so as to stabilize it, reduce corrosiveness e.g. to the skin, increase ease of handling, or reduce the amount of catalyst dust in the air during handling. Typically the amount of inactive materials in the catalyst is small, such as less than 10%, less than 5%, 4%, 3%, 2%, 1%, 0.5% or less than 0.1% (w/w) inactive material. When the amount of inactive material is zero, the catalyst is an aluminosilicate mineral.

It is an advantage of the present process that a very low amount of catalyst material can be used to catalyze the process while maintaining high yields of the biofuel product. This reduces the cost of the process as the catalyst is one of the expensive input materials to the process. Hence, in another embodiment the percentage of aluminosillicate mineral in the catalyst-feedstock mixture is less than 10% (w/w), such as less than 9.0%, 7.0%, 5.0%, 4.0%, 3.0%, 2.0%, 1.5%, preferably less than 1.0% (w/w). The percentage of aluminosillicate mineral in the catalyst-feedstock mixture may be in the range of 0.3-10% (w/w), such as 0.5-10%, 1.0-10%, 2.0-10%, 4.0-10% (w/w). Alternatively it may be present in the range of 0.3-9.0% (w/w), 0.5-9.0%, 0.5-7.0%, 0.5-5.0%, 1.0-5.0%, or 1.0-4.0% (w/w).

Furthermore, any contaminant present in the catalyst, such as for example heavy metals, which may typically be transferred to the residual material of the process, will be present in lower amounts therein. The amount of aluminosilicate mineral in the catalyst-feedstock mixture is naturally always either the same or slightly lower than the amount of catalyst.

In a preferred embodiment the present process is solvent-free. By this is meant, that the process of the invention is performed without the addition of any solvents, such as water or organic solvents. As mentioned small amounts of water may be present in the feedstock and/or catalyst, however neither the feedstock nor catalyst is water-soluble, and no water is added. An advantage of the present invention is the simplicity of the chemistry involved, and thus in a preferred embodiment the mixture of catalyst and feedstock transferred to the reactor is a mixture essentially consisting of catalyst and feedstock, i.e. wherein in no additional ingredients are included. Thus such a preferred process does not make use of any solvent, sentizisers, or other further active ingredients.

Excessive gas flow rate through a condensing unit may present problems in biofuel production processes such as the process of the present invention. This is due to some of the biofuel gas fraction not being condensed into liquid if passing too fast through the condenser consequently passing through vacuum pumps, ventilators or other parts of the system where it may have harmful effects and reduce lifetime of various elements of the process system. Also it may reduce the yield of biofuel product, as such fractions are not processed further in the correct fashion and ends up as an impure fraction at best, if collected at all. Therefore, in a preferred embodiment of the present invention the flow rate of the gaseous biofuel component may be lower than 3.5 m/s, such as less than 3.0 m/s, 2.5 m/s, 2.0 m/s, 1.5 m/s, 1.0 m/s, such as less than 0.7 m/s in the condenser units, i.e. gas-gas heat exchanger and gas cooler.

The process of the present invention may be followed by a subsequent in-line refinement process. Such refinement processes may include hydrogenation including hydrogenation of organic acids and/or desulphurization.

Process Energy Recycling

The Microwave enhanced Thermo Catalytic Depolymerisation Process of the present invention typically produces energy output other than the biofuel output and residual material. This may be in the form of for example heat and volatiles that are not collected as biofuel product.

Thus, in one embodiment volatile hydrocarbons not captured in the condenser units (14), are transferred to a gas heater, such as a burner (21) and used directly for process heating. Process heating may include for example preheating and/or drying of feedstock. Alternatively, the volatiles are used in a generator to provide recycled energy to the process. Electricity consuming parts of the present process may be fully or partially driven by a generator, and hence volatile hydrocarbons from the process may be used to run this generator, thereby facilitating energy recycling, and thus a higher net energy output. Furthermore, the exhaust from the generator may be used to heat up a thermo oil for process heating via a heat exchanger.

In further embodiments the residual heat in the residual material cooler (12) is used to preheat the feedstock or for other process heating, and/or the heat from condensation of water from the dryer (5) is used for process heating, and/or the heat from the gas cooler (16) is used for process heating. Heat transfer may be performed using various forms of heat exchangers or other methods.

Thus, in a preferred embodiment of the present process energy recycling is employed for at least 1 process energy output, such as at least 2 process energy outputs, 3 process energy outputs, 4 process energy outputs, preferably at least 5 process energy outputs.

Feedstock and Pretreatment of Feedstock

In addition to the properties described in the definition of the feedstock, it may further be described by the below preferred embodiments, where pretreatments of the feedstock are also described.

In a preferred embodiment the feedstock is a solid feedstock. In the present context a solid feedstock is a feedstock capable of being pelletized, and thus may include semi-solids such as slurries. It is also preferred, that the feedstock has a water content prior to any heating or preheating that is no higher than 40%, such as no higher than 35%, 30%, 25%, 20%, preferably no higher than 15%. It is also preferred that after pretreatment, i.e. prior to transfer to the reactor, the water content is no higher than 15%, such as no higher than 10%, 7%, 5%, 3% preferably no higher than 2%. A low water content provides for a more energy efficient process, as heating the water in the feedstock does not, at present, contribute to any useful energy output, and also any re-condensed water may have to be separated from the biofuel product. It is however an advantage of the present process that it is effective even when using feedstock containing some percentage of water. This reduces demands to the pretreatment of the feedstock.

Preferably the feedstock is a raw feedstock. A raw feedstock is herein defined as a feedstock that has not been subject to any chemical pretreatment, i.e. it has not been chemically modified via chemical reactions or high temperature reactions (>200° C.) prior to the pretreatments of the present process.

The feedstock may preferably be biomass, i.e. feedstock stemming from natural sources. The biomass may advantageously be raw and/or solid as described above. The biomass may be selected from the group consisiting of agricultural waste products, non-food agricultural products and mixtures thereof. The use of agricultural waste products or non-food agricultural products leads to so-called $2^{nd}$ generation biofuels, i.e. in contrast to $1^{st}$ generation biofuel products which are obtained from the more lipid rich often edible parts of agricultural plants, such as oils, seeds, cobs or grains. Preferably the feedstock is selected from, but not limited to, the group consisting of straw, slurry, slurry fibers, rape cakes, energy willow, nut shells, wood chips, wood pellets, algae, sludge, household waste, recycling centre waste, pressure-creosoted wood, used tires, and plastic waste. A preferred group of feedstock is a group comprising biomass feedstocks such as a group selected from straw, slurry, slurry fibers, rape cakes, energy willow, nut shells, wood chips, wood pellets, algae and pressure-creosoted wood. An even more preferred group of feedstock is straw and rape cakes. Straw is to be understood as the stems, leaves or straw of for example agricultural plants, such as e.g. wheat, barley or corn, but may also be straw from non-agricultural plants such as weeds. Within the present context slurry is a thick suspension of slurry fibers in water. Slurry fibers are a carbon rich fibrous material, such as for example manure slurry fibers from farm animals or slurry fibers from waste treatment plants, e.g. waste water management systems.

The feedstock is subject to pretreatment prior to transfer to the reactor. Pretreatment may comprise e.g. preheating (2, 4) and/or pelletization and may vary according to feedstock as described below. The catalyst may be added at any point during pretreatment or after pretreatment.

As described, the preheating may also comprise the water removal stage and optionally the intermediate stage. In these embodiments the temperature of the feedstock prior to entering the reactor is represented by the temperature intervals of said stages. Preheating in the present context includes both actual heating but also maintaining a given feedstock temperature. The feedstock may for example be preheated in a heated silo using e.g. thermo oil, steam or hot air. Feedstock may also be fully or partially preheated during other pretreatment steps such as for example during shredding or pelletization.

The feedstock may preferably be pelletized e.g. prior to any preheating step. Pelletization provides for a uniform feedstock which is well-adapted to automated delivery systems as used in the present process. Using a uniform feedstock minimizes the potential for e.g. clogs within the system and/or non-uniform mixing with catalyst and/or non-uniform heating of feedstock-catalyst mixture. The preferred pellet size for the present system is 2-200 mm, 5-100 mm, 10-50 mm such as 15-30 mm, however the preferred size may vary e.g. with the scale of the entire process system. Some feedstock may not be directly applicable to a pelletization procedure. For example straw may be delivered as a bale of straw. A bale of straw may preferably go through several steps prior to pelletization including, but not limited to: metal detection, fluffing/tedding, shredding and/or milling. Similarly other feedstocks may be subjected to a process involving one or more of the above pretreatments of metal detection, fluffing/tedding, shredding and/or milling prior to the pelletization steps.

Biofuel and Residual Material Output

In a preferred embodiment the biofuel of the present invention comprises a renewable diesel component. As mentioned, diesel may be defined in a number of ways. For example diesel in its broadest sense is a fuel capable of running a diesel engine. It may also be described as the fraction obtained from fractional distillation of crude oil or biofuel between 115-350° C. Also the molecules in typical diesel fuel have 8-21 carbon atoms. There are also other types of diesel, e.g. marine diesel that has a higher percentage of crude oil or heavy oil.

Renewable diesel or "green diesel" may be defined in similar ways, but generally contains some percentage of diesel originating from a non-fossil resource such as animal fat, vegetable fat, or as in the present context a feedstock from a biological or renewable resource.

The biofuel output may furthermore be refined to produce a higher quality biofuel such as a diesel, preferably a biodiesel fulfilling national, regional and/or international requirements to be marketed as either diesel or preferably a form of environmentally friendly diesel. Some or all of these refinement processes may be incorporated in the present process. Hence, in a preferred embodiment the present process includes a water separation step. As water and the present biofuel product are immiscible and have differing densities, both centrifugation and the use of a fuel separation tank, where fuel is e.g. decanted off may be employed to provide this separation. Also a commercially available desulphuring unit may be adapted to the present process setup.

In another embodiment the yield of biofuel output as compared to feedstock input measured in kilograms is at least 10%, such as at least 15%, 20%, 30%, 35%, preferably at least 40%. For a continuous process yields may be determined for a given time frame of operation, for example you may compare feedstock input over 60 min with biofuel output for the same time frame.

In another embodiment the biofuel has a calorific value of at least 10 MJ/Kg, 15 MJ/Kg, such as at least 20 MJ/Kg, 25 MJ/Kg, 27 MJ/Kg, 29 MJ/Kg, preferably at least 31 MJ/Kg. A biofuel product with a high calorific value is generally an advantage as this value determines how much energy or power may be extracted per weight unit of a given fuel. The process of the present invention breaks down lignin in feedstocks to produce a biofuel having a reduced lignin content. The biofuel output may thus have a lower content of lignin than biofuels made from processes using conventional heating.

It is an advantage of the present process that the residual material contains useful elements and minerals and has retained a fibrous structure and may be used as a fertilizer or fertilizer additive. Without being bound to theory it is believed that a fibrous structure is retained due to the relatively low temperature of the process. To be used as a fertilizer or additive the residual material must have low amounts of heavy or toxic metals. Thus, in another embodiment the residual material contains less than 5.0 ppm heavy metals, such as less than 2.0 ppm, 0.5 ppm, 0.10 ppm, 0.07 ppm, preferably less than 0.05 ppm heavy metals. By heavy metals is meant toxic and heavy metals, such as Pb, Cd, Cr, and Cu. The amount of heavy metals may be determined using X-ray analysis.

Another aspect of the present invention is a biofuel product obtainable by the process according to the invention. Biofuel products generally vary according to feedstock and the process used for fuel generation. Therefore, for a given feedstock a biofuel produced by the present process will be novel and unique. It will furthermore be identifiable by for example a gas chromatographic or mass spectrometric "fingerprint". Advantages of the present biofuel product are a high percentage of diesel component and a high calorific value.

It should be noted that embodiments and features described in the context of one of the aspects of the present invention also apply to the other aspects of the invention.

All patent and non-patent references cited in the present application, are hereby incorporated by reference in their entirety.

The invention will now be described in further details in the following non-limiting examples.

Detailed Description of FIG. 1

The feedstock is fed to the dryer (2) through line 1. The feed is dried by contact with hot air fed to the dryer (2) through line 3, and drawn from the feed pre-heater (4). The feed moisture content evaporated in the dryer (2) is condensed in the water condenser (5) and collected as purified water. The drying air is emitted to the environment. The dried feed is further heated in the feed pre-heater (4). The pre-heated feed is mixed with catalyst through lines 6 and 7. Recycled catalyst may be added to the catalyst and feed mixture in line 8 through line 9, and introduced into the reactor (10). Solid residual material is removed from the reactor (10) through line 11. Part of the material is recycled to the feed flow through line 9, and the rest is cooled in the residual cooler (12) and collected for further handling. The oil product is collected as vapor through line 13, and cooled in the gas-gas heat exchanger (14). Condensation of some oil product takes place during the cooling. The condensed oil species are collected through line 15. Uncondensed gas and vapor is led to the gas cooler (16) through line 17 by the gas ventilator (18). Further condensation takes place in the gas cooler (16), and the condensed oil product is collected through line 19 and mixed with line 15 before introduction to the oil dewatering (20). The oil dewatering produces purified oil product (biofuel) and waste water for further treatment. The gas stream from the gas ventilator (18) is re-heated in the gas-gas heat exchanger (14) and further heated in the gas heater (21) before introduction to the feed pre-heater (4) through line 22. The gas heater (21) is an in-line gas burner.

Figure 2:
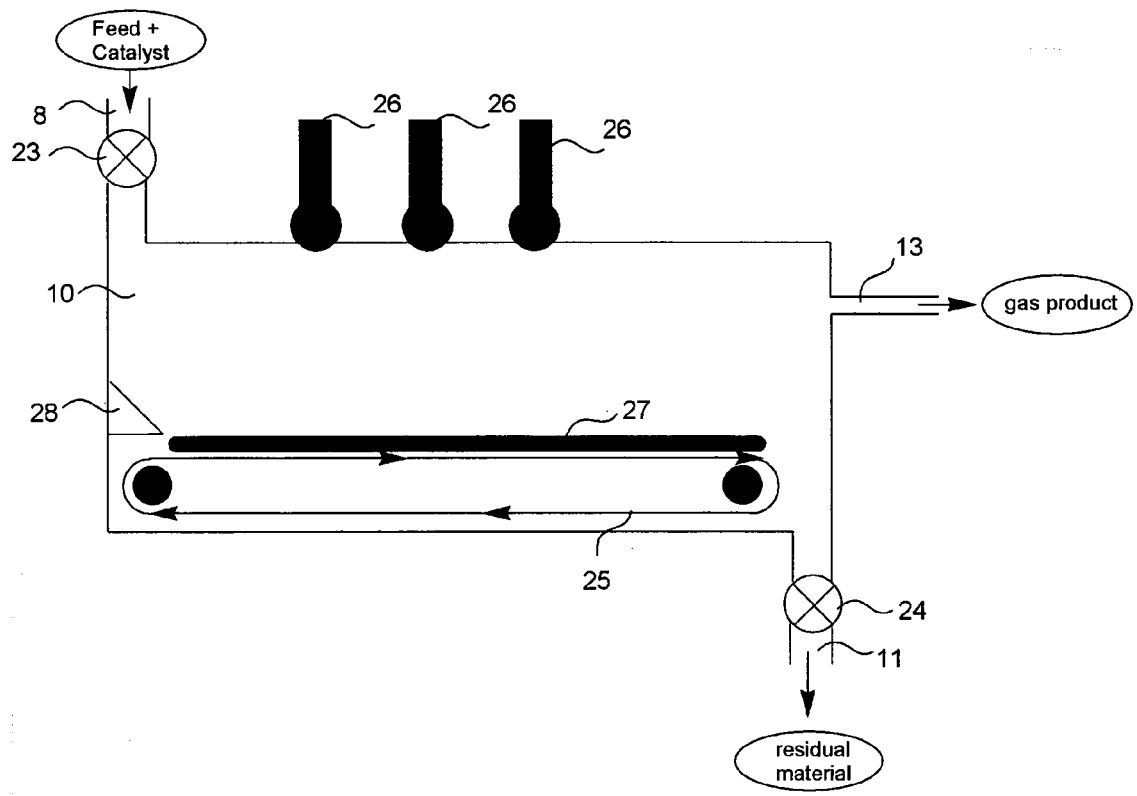
FIG. 2 is a diagram showing one example of a reactor setup comprising a moving bed. An explanatory text to FIG. 2 is found at the end of the detailed description.
Figure 3:
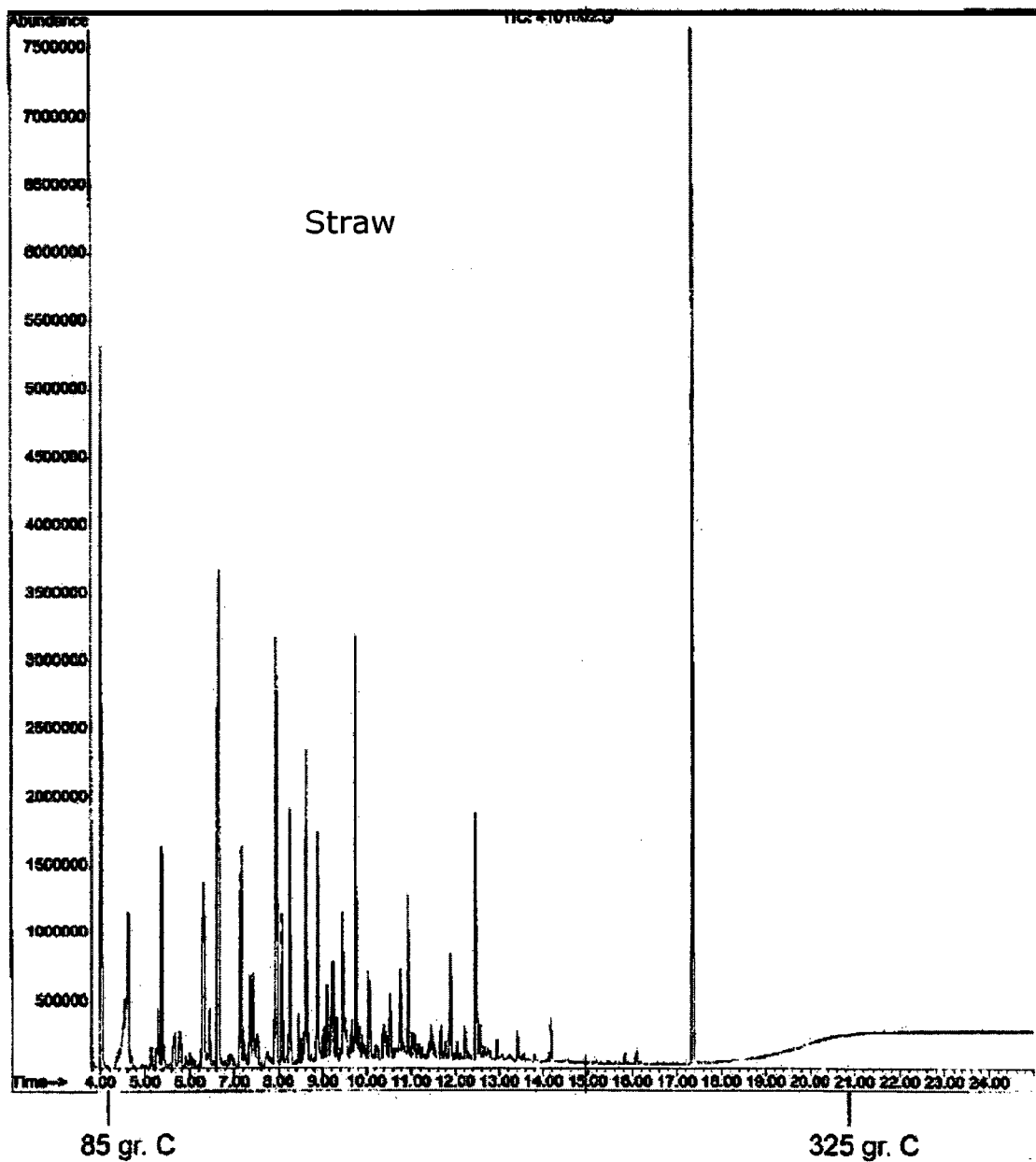
FIG. 3 shows a gas-chromatogram of the biofuel product obtained from using straw as a feedstock in the process of the present invention.
Figure 4:
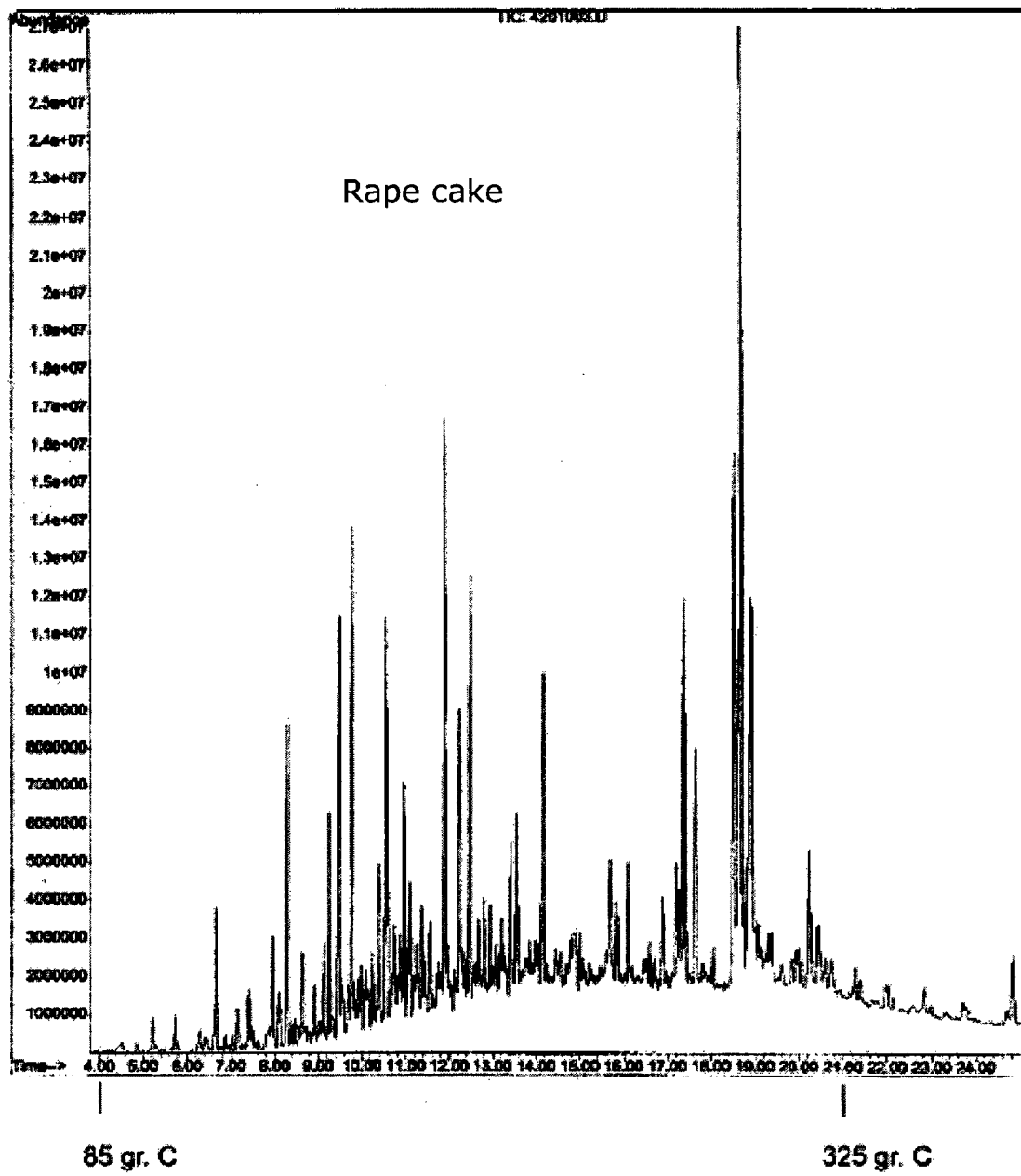
FIG. 4 shows a gas-chromatogram of the biofuel product obtained from using rape cake as a feedstock in the process of the present invention.

Detailed Description of FIG. 2

The mixture of feedstock and catalyst is fed to the reactor (10) from line 8 through the inlet cell sluice (23). The cell sluice minimizes air intrusion through the feed line (8). The mixture is guided by the feed guide (28) to the conveyor (25), forming a moving bed (27) travelling through the reactor (10). The conveyor (25) is designed to ensure material mixing, e.g. by static mixers. A multitude of microwave generators (26) are mounted in the ceiling of the reactor (10). The microwave generators (26) comprise a magnetron, generating the microwaves. The microwaves are led through a waveguide to a circulator, which prevents microwave reflection backwards into the magnetrons from the reactor (10). The circulators are mounted on microwave horns, i.e. wave guides designed to distribute the microwave field in the reactor (10). Microwaves are generated in the microwave generators (26) and penetrating the moving bed (27) comprising the mixture on the conveyor, thereby heating the mixture and activating the catalyst. As a result feedstock organic molecules are by catalytic chemistry converted into various oil compounds, which evaporate when the moving bed reaches the appropriate temperature (the compound boiling point). The oil product vapors are removed from the reactor (10) through line 13, and condensed. The inconvertible residual material, including ash, catalyst and non-volatile organics is removed from the reactor through the outlet cell sluice (24) into line 11.

EXAMPLES

Example 1—Production of Biofuel from Pelletized Straw

The following mixture of feedstock and catalyst was processed according to the process of the present invention:
Process Parameters:
102 Kg straw (shredded and pelletized)
2 Kg aluminosilicate catalyst (2% catalyst loading)
Operating pressure: 99-101 kPa
Preheating temperature: 90° C.
Maximum process temperature: 330° C.
Microwave radiofrequency: 2.45 GHz
Heating sequence time: 60 min The straw was pretreated, which included shredding, pelletizing and pre-heating to 90° C. The pelletized straw was mixed with catalyst, or alternatively the catalyst was added prior to pelletization and preheating. The catalyst used was a synthetic zeolite, such as for example Purmol 13®

(Zeochem.ch) or ZP-4A (Silkem.si). The feedstock-catalyst mixture was transferred to the reactor and subjected to the heating sequence of the invention. Nitrogen was added to the reactor to minimize the presence of oxygen.

From several experiments using the above feedstock/catalyst mixture the following products were obtained (Table 1):

TABLE 1

Output from straw feedstock

| | Amount (Kg) | Distribution percentage of liquid components | Adjusted distribution percentage* |
|---|---|---|---|
| Fuel components | 33 Kg | 72% | 40% |
| Water | — | 28% | 16% |
| Residual material | 23 Kg | — | 25% |
| Volatile hydrocarbons | — | — | 19% |

*Values for residual material and volatile hydrocarbons are averages based on numerous experiments.

Example 2—Production of Biofuel from Pelletized Rape Cakes

The following mixture of feedstock and catalyst was processed according to the process of the present invention:
Process Parameters:
  100 Kg rape cake (shredded and pelletized)
  4 Kg aluminosilicate catalyst (4% catalyst loading)
  Operating pressure: 99-101 kPa
  Preheating temperature: 90° C.
  Maximum process temperature: 330° C.
  Microwave radiofrequency: 2.45 GHz
  Heating sequence time: 60 min The rape cake was pretreated, which included shredding, pelletizing and pre-heating to 90° C. The pelletized straw was mixed with catalyst, or alternatively the catalyst was added prior to pelletization and preheating. The catalyst used was a synthetic zeolite, such as for example Purmol 13® (Zeochem.ch) or ZP-4A (Silkem.si). Nitrogen was added to the reactor to minimize the presence of oxygen.

From several experiments using the above feedstock/catalyst mixture the following products were obtained (Table 2):

TABLE 2

Output from rape cake feedstock

| | Amount (Kg) | Distribution percentage of liquid components | Adjusted distribution percentage* |
|---|---|---|---|
| Fuel components | 39 Kg | 63% | 35% |
| Water | — | 37% | 21% |
| Residual material | 28 Kg | — | 25% |
| Volatile hydrocarbons | — | — | 19% |

*Values for residual material and volatile hydrocarbons are averages based on numerous experiments.

Example 3—Further Analysis of Biofuel Component and Residual Material

A qualitative analysis of the individual compounds of the fuel component was conducted for both straw and rape cake. It was found that both feedstocks resulted in a fuel component comprising phenol and phenol derivatives, indicating the ability of the present process to break down lignin components of plant material.

For straw feedstock the biofuel and residual material were analysed, the results being depicted in tables 3-5 below:

TABLE 3

Components of biofuel product from straw feedstock

| Component group | Typical components |
|---|---|
| Phenol derivatives | Phenol, methylphenol, ethylphenol, methoxyphenol |
| Other aromatic compounds | Toluene |
| Polyaromatic hydrocarbons (PAH) | Naphthalene |
| Alkanes | All types from $C_6H_{14}$ to $C_{16}H_{34}$ |
| Organic acids | Phenyl ethanoic acid |
| Alcohols | Methanol, ethanol |

TABLE 4

Physical and chemical properties of biofuel product from straw feedstock

| Property | Value | |
|---|---|---|
| Physical state (20° C.) | Liquid | |
| Colour | Brown | |
| Density (20° C.) | 1.0 g/cm$^3$ | |
| Boiling Point | 100-350° C. | |
| Flashpoint | <0° C. | |
| Calorific value | 31.6 MJ/Kg | |
| Solubility | Propanone | Soluble |
| | Hexane | Partly soluble |
| | Dichloromethane | Soluble |

TABLE 5

Analysis of elements in residual material from straw feedstock

| Element | Weight % | Element | Weight % |
|---|---|---|---|
| C | 54.00 | Ca | 2.0000 |
| H | 3.80 | Ti | 0.0130 |
| N | 1.00 | Cr | 0.0019 |
| O | 17.00 | Fe | 0.8900 |
| Na | 0.62 | Cu | 0.0024 |
| Mg | 0.23 | Zn | 0.0077 |
| Al | 0.41 | Sr | 0.0150 |
| Si | 5.60 | Ba | 0.0120 |
| P | 0.39 | Pb | 0.0023 |
| S | 0.36 | Cd | — |
| K | 4.00 | Cl | — |

Analysis performed by elemental analysis (organic) or X-ray analysis (inorganic); a dash (—) means the value is below detection value of 0.001%.

The low amounts of heavy metals or toxic metals (e.g. Pb, Cd, Cr, Cu), and higher amounts of minerals indicates that the residual material is useful as for example a fertilizer or fertilizer additive.

Example 4—Production of Biofuel from Pelletized Straw at Low Catalyst Load

The following mixture of feedstock and catalyst was processed according to the process of the present invention:
Process Parameters:
  2.58 Kg straw (dried, shredded and pelletized)
  0.026 Kg aluminosilicate catalyst (1% catalyst loading)
  Operating pressure: 99-101 kPa
  Preheating temperature: 90° C.

Maximum process temperature: 330° C.
Microwave radiofrequency: 2.45 GHz
Heating sequence time: 60 min The straw was pretreated, which included shredding, pelletizing, drying and pre-heating to 90° C. Upon drying 3 Kg of straw, this lost 14% of its original weight, to obtain 2.58 Kg of straw. The pelletized straw was mixed with catalyst, or alternatively the catalyst was added prior to pelletization and preheating. The catalyst used was a synthetic zeolite, such as for example Purmol 13® (Zeochem.ch) or ZP-4A (Silkem.si). The feedstock-catalyst mixture was transferred to the reactor and subjected to the heating sequence of the invention. Nitrogen was added to the reactor to minimize the presence of oxygen. From the above feedstock/catalyst mixture fuel components were obtained in a yield of 26%, while residual material was obtained in a yield of 35%. Remaining products were volatile hydrocarbons and water. This experiment shows that the process of the invention is effective for catalyst loadings as low as 1%.

REFERENCES

WO 2004/035714
WO 2009/067266
WO 2009/010435
U.S. Pat. No. 6,184,427
CN 20071069214

The invention claimed is:

1. A continuous process for the production of biofuel, said process comprising,
   pretreating a solid feedstock,
   mixing a catalyst with said solid feedstock,
   transferring the mixture of catalyst and solid feedstock into a reactor, and
   subjecting said mixture to a heating sequence controlled by moving said mixture of catalyst and solid feedstock through said reactor past static microwave generators that apply microwave energy thereto, wherein the catalyst comprises zeolite, the percentage of the zeolite in the catalyst-feedstock mixture is less than 10% (w/w), said heating sequence is no longer than 80 minutes, and the temperature of the mixture of catalyst and solid feedstock is no higher than 450° C. during the process, to provide said biofuel.

2. A process according to claim 1, wherein an operating pressure in the reactor is in the range of 50-130 kPa.

3. A process according to claim 2, wherein the operating pressure in the reactor is lower than the atmospheric pressure.

4. A process according to claim 2, wherein the operating pressure in the reactor is higher than the atmospheric pressure.

5. A process according to claim 1, wherein the percentage of the zeolite in the catalyst-feedstock mixture is less than 5% (w/w).

6. A process according to claim 1, wherein the solid feedstock is a raw feedstock.

7. A process according to claim 1, wherein the solid feedstock is a biomass feedstock.

8. A process according to claim 1, wherein the solid feedstock is selected from the group consisting of straw, slurry, slurry fibers, rape cakes, energy willow, nut shells, wood chips, wood pellets, algae, sludge, household waste, recycling centre waste, pressure-creosoted wood, used tires, plastic waste or any combination thereof.

9. A process according to claim 1, wherein the reactor is a moving bed reactor.

10. A process according to claim 1, wherein process energy recycling is employed for at least 1 process energy output.

11. A process according to claim 1, wherein the process is solvent free.

12. A process according to claim 9, wherein the moving bed of catalyst and solid feedstock is provided by a belt conveyor or a screw conveyor.

\* \* \* \* \*